United States Patent [19]

Zegler et al.

[11] Patent Number: 5,477,850

[45] Date of Patent: Dec. 26, 1995

[54] INTEGRATED BUOYANCY SUIT CREW PROTECTION SYSTEM WITH +/−$G_z$ PROTECTION

[75] Inventors: Robert E. Zegler, Redondo Beach; Conrad B. Monson, Yorba Linda; William J. Adams, Torrance, all of Calif.

[73] Assignee: Rockwell International Corp., Seal Beach, Calif.

[21] Appl. No.: 957,301

[22] Filed: Oct. 6, 1992

[51] Int. Cl.[6] .............................. A62B 17/00; A62B 7/04; A61M 16/00; A61G 10/00
[52] U.S. Cl. ............................. 128/202.11; 128/204.29; 128/202.19; 128/205.26
[58] Field of Search ..................... 128/201.22–201.25, 128/201.28, 201.29, 202.11, 202.13, 202.19, 204.15–204.18, 204.23, 204.26, 204.29, 205.12, 205.24, 205.25–205.29, 206, 21, 206.12, 206.23, 206.24, 206.27, 206.28

[56] References Cited

U.S. PATENT DOCUMENTS

| | | | |
|---|---|---|---|
| 3,780,723 | 12/1973 | Van Patten et al. | 128/202.11 |
| 4,243,024 | 1/1981 | Crosbie et al. | 128/202.11 |
| 4,336,590 | 6/1982 | Jacq et al. | 128/202.11 |
| 4,471,332 | 9/1984 | Beassant | 128/202.11 |
| 4,606,340 | 8/1986 | Ansite | 128/205.24 |
| 4,923,147 | 5/1990 | Adams et al. | 244/122 |
| 4,925,135 | 5/1990 | Wurst et al. | 244/118 |
| 5,111,809 | 5/1992 | Gamble et al. | 128/204.18 |
| 5,121,744 | 6/1992 | Njimanze | 128/202.11 |
| 5,127,896 | 7/1992 | de Gast0n | 128/202.11 |
| 5,129,389 | 7/1992 | Tauscher et al. | 128/202.11 |
| 5,208,514 | 5/1993 | Bassick | 128/202.11 |
| 5,245,993 | 9/1993 | McGrady et al. | 128/201.24 |
| 5,247,926 | 9/1993 | Harral | 128/204.23 |

*Primary Examiner*—Kimberly L. Asher
*Attorney, Agent, or Firm*—Lawrence N. Ginsberg; Charles T. Silberberg

[57] ABSTRACT

An apparatus for maintaining useful consciousness and reducing the risk of injury for a subject exposed to high levels of acceleration with substantial components in the +$G_z$ or −$G_z$ direction while in a vehicle. It comprises a buoyancy force suit for supporting the subject with a buoyancy force, the force suit including at least two layers of flexible material, each layer being relatively impermeable to a substantially incompressible fluid having a specific gravity approximating blood being locatable in a space between the layers. A pressure helmet supports the subject's head with a gas pressure force. A Pressure Transfer System (PTS) provides pressure transfer and equalization between the suit and the pressure helmet. The PTS comprises a fluid reservoir segment and a gas reservoir segment. The fluid segment is in fluid communication with the space between the layers of the buoyancy force suit for maintaining a substantially constant fluid level within the suit at all times. The gas segment is in gas communication with space internal to the pressure helmet for maintaining gas pressure force in the helmet substantially equivalent to fluid pressure within the fluid segment of the PTS. A breathing assist mechanism (BAM) senses the pressure of the fluid within the force suit at the subject's chest level, and provides breathing gas to the subject at pressures substantially equal to the chest level fluid pressure and independent of pressure within the pressure helmet.

43 Claims, 7 Drawing Sheets

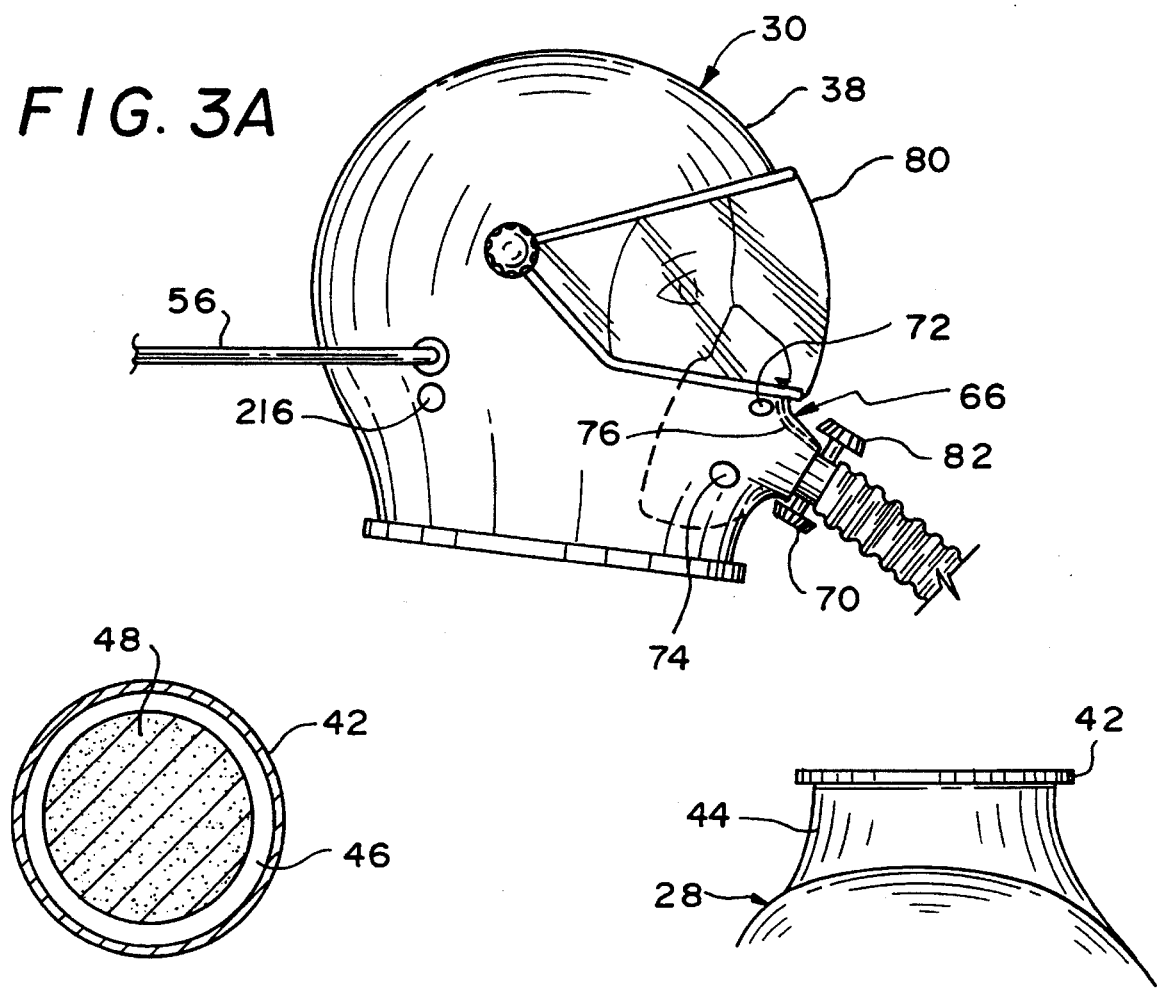
FIG. 3A
FIG. 4A
FIG. 4B
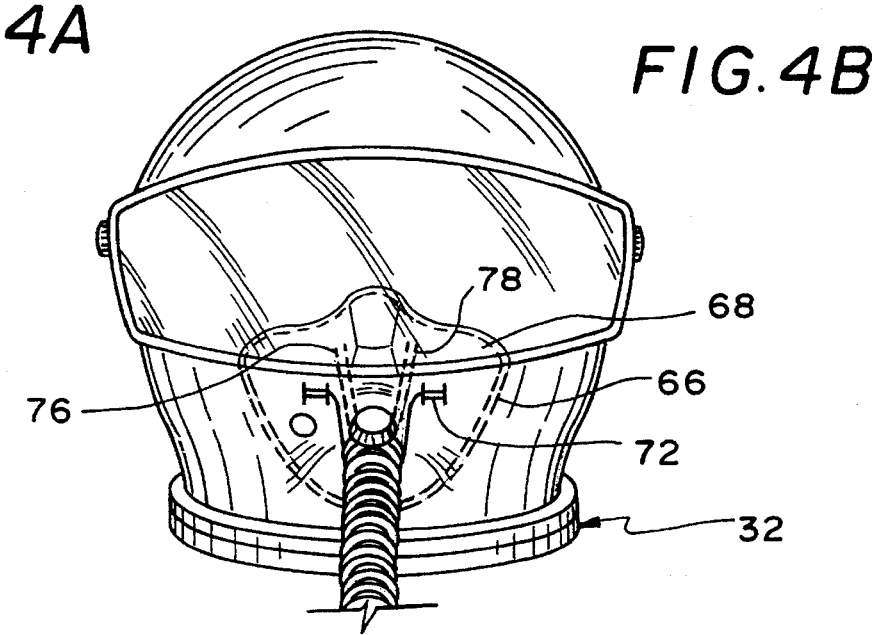
FIG. 3B

INTEGRATED BUOYANCY SUIT CREW PROTECTION SYSTEM WITH +/− $G_z$ PROTECTION

BACKGROUND OF THE INVENTION

This invention relates to anti-G protection and high altitude protection devices of pilots operating high performance aircraft and spacecraft.

During high speed maneuvers in modern-day fighter aircraft, pilots are exposed to acceleration levels that can exceed human tolerance. Devices have been developed to protect pilots primarily from the $+G_z$ (head-to-foot or "eyeballs down") acceleration experienced during rapid turns, during a pull up from a dive or during other combat maneuvers. These techniques include the use of anti-G suits, Positive Pressure Breathing (PPB) and muscular straining. Although increasing pilot G-Tolerance, these measures do not fully protect pilots from G levels produced by both modern and future high performance aircraft.

To provide higher levels of G protection, other devices have been developed. For example, U.S. Pat. No. 4,923,147 entitled "Head Support/Spine Offloading Ejection Seat Insert" assigned to Rockwell International Corporation, and U.S. Pat. No. 4,925,133 entitled "Hydraulic Buoyancy Force Suit" also assigned to Rockwell International Corporation disclose devices for protecting pilots from high levels of $+G_z$ acceleration.

Although neither of these devices has yet been flown in an aircraft, tests have shown the value of both a buoyancy suit and a head support/spine offloading device for pilot acceleration protection.

The Integrated Crew Protection System (ICPS) disclosed herein includes a buoyancy suit and thus the $+G_z$ protection capabilities of this type of G-protection device. In addition, as will be described below with the use of a pressurized helmet whose pressure can be regulated by acceleration levels, an ICPS also provides protection from $-G_z$ (foot-to-head or "eyeballs up") acceleration, a feature not found in the '147 patent, the '133 patent or in other G-protection devices such as PPB or G-suit systems. Furthermore, in other G-protection systems such as the "Combination Anti-G and Pressure Suit" suit disclosed by Row in U.S. Pat. No. 5,007,893, $-G_z$ acceleration protection is not provided. Thus the ICPS disclosed herein provides high levels of G protection for the complete range of $G_z$ acceleration; i.e., acceleration in both the + and − directions along an axis representing $G_z$ forces.

In addition to acceleration protection requirements, pilots of modern high performance aircraft can fly at altitudes that are intolerable to human pilots and thus have an altitude protection need. Protection from the low atmospheric pressures at high altitude is typically provided by a pressurized cockpit. During emergencies including battle damage and cockpit pressure system failures, the cockpit can depressurize leaving an unprotected pilot exposed to potentially fatal low atmospheric pressures. In these depressurization emergencies, a pressurized flight suit can save a pilot's life. In addition, a pressurized flight suit used during routine operations and not just during emergencies can result in a decreased pressurization requirement for a cockpit. A decreased pressure requirement results in decreased cockpit weight with a concomitant increase in aircraft performance.

Pilots of spacecraft are also faced with the need for pressurized flight suits to provide emergency protection and to reduce cabin pressurization requirements. Because of the higher altitudes, the effect of cabin depressurization can be more severe in spacecraft than in high performance aircraft.

With the pressure transfer component of the ICPS disclosed herein, high altitude protection is provided to altitudes encountered by pilots of spacecraft, not just high performance aircraft. Thus, in addition to $+G_z$ and $-G_z$ acceleration protection capabilities, the ICPS provides altitude protection thereby protecting pilots of high performance aircraft and spacecraft from two of the greatest hazards encountered during flight, namely acceleration and altitude. This dual protection feature of the ICPS is not provided by other G-protection or high altitude protection equipment.

In addition to acceleration and high altitude hazards, pilots of modern, high performance aircraft are also faced with thermal, biological, chemical and radiation hazards.

Thermal hazards occur during normal and emergency operations in excessively hot or cold environments. If the thermal environment raises or lowers body temperature more than 1° or 2° C., the ability of a pilot to perform normal flight tasks can be impaired. If the changes in core temperature are too extreme, ethality can result. Thus, thermal protection must be provided to ensure pilot comfort, unimpaired task performance and survival. The ICPS with a thermal management system, provides this protection capability. As will be disclosed below, the temperature of the fluid flowing through the ICPS hydraulic force buoyancy can be easily regulated to warm or cool a pilot wearing the suit. Because the suit covers most of the body, the heating and cooling capability of the ICPS is better than would be provided by currently-available cooling and heating vests that circulate water through a vest surrounding just the torso.

As will be shown below, the thermal regulating capability that is part of the ICPS is also useful for chemical, biological and radiation (CBR) protection. During combat, the possibility of attacks from chemical, biological and nuclear weapons necessitates the use of protective equipment including garments made of CBR protective materials. These garments are usually uncomfortable and hot. The thermal management system of the ICPS could be used to maintain a comfortable body temperature for subjects wearing CBR garments over the ICPS hydraulic force buoyancy suit. The hydraulic force buoyancy suit itself can be made of CBR protective materials thereby eliminating the need for separate CBR protective garments. Similarly, the pressurized helmet and breathing mask that are part of the ICPS could also provide CBR protection eliminating the need for separate CBR hood and mask ensembles. With CBR filters and other modifications, the ICPS could be a complete, self-contained CBR protection system that would also provide protection acceleration and high altitude. The ability of a single life support system worn by a pilot to provide protection from these multiple hazards is not found in currently available G-protection, high altitude or CBR protection equipment.

Furthermore, during ejections over cold ocean waters, pilots can be exposed to water temperatures that will cause hypothermia and death unless protective measures are employed. As will be disclosed below, the ICPS includes an Emergency Thermal Management System (ETMS) located in the pilot's survival pack. The ETMS circulates warm water through the hydraulic force buoyancy suit component thereby keeping a pilot warm while exposed to cold, potentially lethal water; With this ETMS, a pilot's life could be preserved until rescue could be affected. This emergency warming feature of the ICPS is not available in survival kits used in modern, high performance aircraft and thus represents a significant improvement over current survival equipment.

SUMMARY OF THE INVENTION

The present invention is an apparatus for maintaining useful consciousness and reducing the risk of injury for a subject exposed to high levels of acceleration with substantial components in the $+G_z$ or $-G_z$ direction while in a vehicle. It comprises a buoyancy force suit for supporting the subject with a buoyancy force, the force suit including at least two layers of flexible material, each layer being relatively impermeable to a substantially incompressible fluid having a specific gravity approximating blood being locatable in a space between the layers. The suit fits over substantially the entire subject. A pressure helmet supports the subject's head with a gas pressure force, the helmet including an outer shell relatively impermeable to gases comprised of air, oxygen, nitrogen, or helium. The helmet fits entirely over the subject's head. The pressure helmet is securely connected to the suit for creating a pressure seal and maintaining a positive pressure in the helmet. A Pressure Transfer System (PTS) provides pressure transfer and equalization between the suit and the pressure helmet. The PTS comprises a fluid reservoir segment and a gas reservoir segment. The fluid segment is in fluid communication with the space between the layers of the buoyancy force suit for maintaining a substantially constant fluid level within the suit at all times. The gas segment is in gas communication with space internal to the pressure helmet for maintaining gas pressure force in the helmet substantially equivalent to fluid pressure within the fluid segment of the PTS. The PTS further includes a mechanism for separating the fluid and gas reservoir segments and maintaining the segments in pressure communication with each other without physical mixing of the fluid gas substances of either reservoir segment. A breathing assist mechanism (BAM) senses the pressure of the fluid within the force suit at the subject's chest level, and provides breathing gas to the subject at pressures substantially equal to the chest level fluid pressure and independent of pressure within the pressure helmet.

Other objects, advantages and novel features of the present invention will become apparent from the following detailed description of the invention when considered in conjunction with the accompanying drawings.

BRIEF DESCRIPTION OF THE DRAWINGS

FIG. 3A is a side view of the pressure helmet system of the present invention.

FIG. 3B is a front view of this pressure helmet system.

FIG. 4A is a top view of the suit/helmet interface, in cross section.

FIG. 4B is a side view of the suit/helmet interface of FIG. 4A.

The same elements or parts throughout the figures are designated by the same reference characters.

DETAILED DESCRIPTION OF THE PREFERRED EMBODIMENTS

The present invention is an accomplishment of three things: 1) pilot protection from accelerations with substantial components in the +Z direction, 2) pilot protection from accelerations with substantial components in the −Z direction, and 3) pilot high altitude protection.

Figure 1:
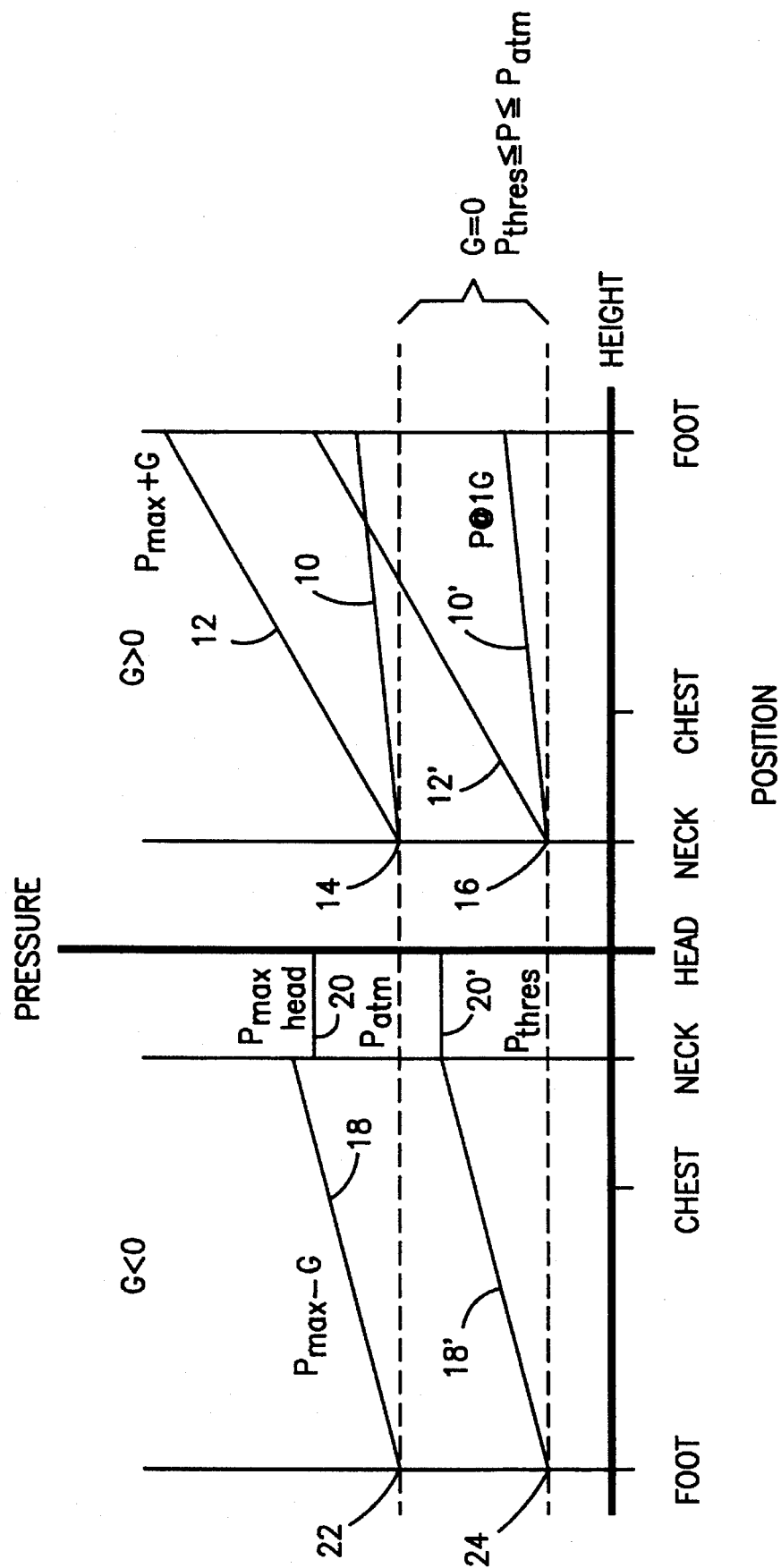
FIG. 1 is a graphical description of the theory behind the integrated buoyancy suit system of the present invention.

Referring to the drawings and the characters of reference marked thereon, FIG. 1 illustrates the overall pressure profile necessary to provide adequate pilot protection under adverse G-loading and atmospheric pressure conditions. Line 10 illustrates the hydrostatic theory underlying the buoyancy suit system disclosed in U.S. Pat. No. 4,925,133, above. Line 10 graphically illustrates the hydrostatic gradient provided by the buoyancy force suit described in the '133 patent as affected under normal gravity (1G) conditions between the neck and the foot, where the suit covers the body. There is no solid line between the head and the neck because the head is not covered by the suit and is not exposed to the hydrostatic gradient created by that suit. Line 12 represents the same hydrostatic theory under a high acceleration condition induced through aircraft tactical maneuvers. Lines 10 and 12 represent the basic characteristic envelope of positive $G_z$ protection provided by the basic buoyancy force suit of the '133 patent.

The total pressure within the buoyancy force suit is composed of two pressure components, the first component being the residual pressure within the system that would be present under zero gravity conditions; and, the second component being the hydrostatic component as affected by density of the fluid, height in the system, and force of gravity. The characteristic envelope depicted by lines '10 and 12 are shown to initiate at a pressure equal to atmospheric pressure (Patm) at the neck (point 14). This is essentially comparable to the pressure that would be seen at the surface of an open column of water of the same height at atmospheric conditions. For the system of the present invention, the highest atmosphere pressure associated with point 14 would be standard sea level pressure, or 14.7 psi. At this atmospheric pressure, and under a maximum acceleration ($+G_z$) induced on the system, the maximum pressure in the suit is illustrated by line 12 as it intersects the foot position ($P_{max}$ +G). Point 16 is basically the same as point 14 with the exception that the initial pressure in the system at this point described as the force suit system residual pressure component has dropped to a value less than that of standard sea level conditions. This occurs when the system increases in altitude. The initial pressure value shown at point 16 is depicted as limiting pressure, that pressure being the minimum threshold pressure necessary to preclude ebullism (i.e. $P_{thres}$). Allowing pressure to fall below this minimum pressure would introduce a serious hazard to the pilot. Lines 10' and 12' form the new characteristic envelope of pilot $+G_z$ protection as it is effected by the initial pressure at point 16. The characteristic envelope of protection will translate between points 14 and 16 as the initial pressures vary between maximum atmospheric pressure ($P_{Atm}$) and the minimum threshold pressure ($P_{Thres}$).

As further illustrated in FIG. 1, pressure values within the suit under conditions of zero G are shown to fall within the range between $P_{Atm}$ and $P_{Thres}$ with the absence of the influencing hydrostatic gradient pressure component. The hydrostatic gradient component of the characteristic theory describing the pressure within the suit is reduced to zero under zero gravity conditions. These conditions would occur at orbital altitudes, or during aircraft descent. Since orbital altitudes mean that the total atmospheric pressure will fall to zero, the envelopment of the entire body is necessary to provide adequate pressure protection. The force suit will provide the majority of the protection between the neck and the feet which requires only that the head be considered separately. For the present invention, this protection is provided by the pressure helmet. Regulation of the suit and helmet pressures must be provided to ensure that an adequate pressure continuum is maintained between the parts of the body exposed to the hydrostatic gradient pressure provided by the force suit., and the head which would be surrounded by continuous air pressure provided by the pressure helmet. This capability will prevent residual pressure within the suit and helmet systems from dropping below the minimum threshold pressure ($P_{thres}$) under the extreme high altitude condition.

In the case of aircraft descent, the gravity field experienced by the pilot will approach zero and perhaps surpass zero entering into a "negative" gravity field condition. This condition will become more extreme as aircraft descent rates increase. Under a zero G descent condition, the pilot is adequately protected by the system as described in the previous paragraph.

Under $-G_z$ conditions, protection can be enhanced by allowing increased pressurization to the head. Ideally, the pressure provided to the head should be a continuum of the hydrostatic gradient pressure component of the body between the neck and the foot. Under negative $G_z$ conditions, this gradient will be essentially reversed from that of the positive G condition. This novel envelope of protection is illustrated by lines 18, 18', 20 and 20' in FIG. 1. Line 18 describes a hydrostatic gradient pressure component within the buoyancy force suit under a maximum negative G condition between the foot and the neck. The highest pressure is found at the neck. Line 20 describes the pressure continuum of air within the helmet surrounding the head. The pressure associated with line 20 is shown to be slightly less than the maximum pressure of line 18 (at the neck). This is to illustrate that there is a maximum limit to the amount of air pressure that can be safely applied. Since line 18 represents the maximum pressure gradient component within an initial residual pressure of $P_{Atm}$ as shown by point 22, it is assumed that under conditions of high negative $G_z$ the total pressure of the system at the neck will be greater than maximum allowable pressure to the head. As the initial residual pressure of the system decreases towards $P_{thres}$ (point 24) the pressure within the force suit and helmet will approach lines 18' and 20'. Since the lower initial residual pressure results in a lower overall total pressure, there will be a point between lines 18 and 20 and lines 18' and 20' where the maximum hydrostatic gradient pressure seen at the neck will approach and then can be equal to the maximum allowable safe air pressure continuum within the helmet. At that point, the pressure within the system will decline equally to lines 18' and 20' as the initial residual pressure decreases.

Figure 2:
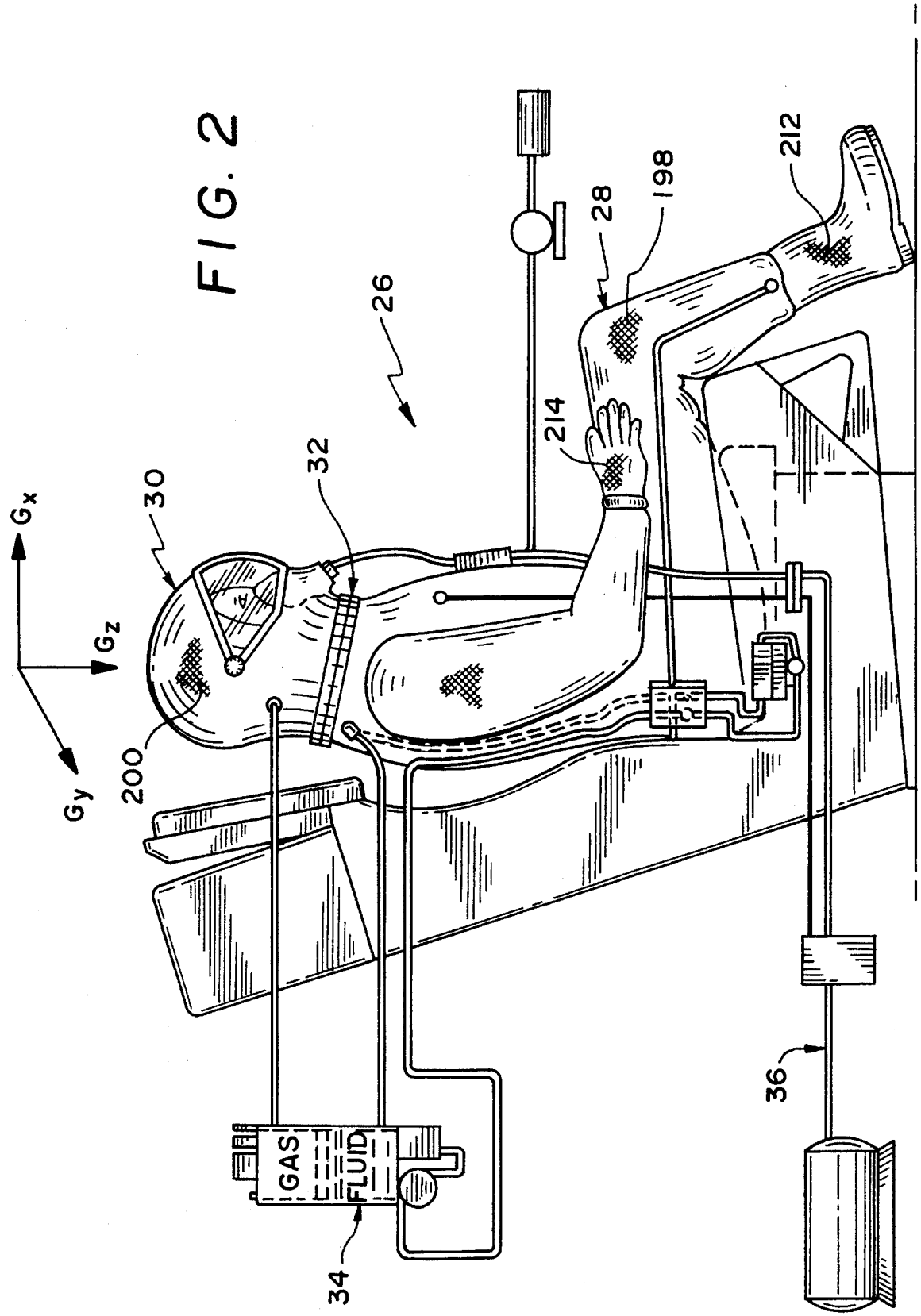
FIG. 2 is a side view of a crew member in a seat of an aircraft utilizing the integrated buoyancy suit system of the present invention.

Referring now to FIG. 2, the overall integrated buoyancy suit system is illustrated, designated generally as 26. Apparatus 26 includes a buoyancy force suit 28, a pressure helmet 30, means 32 for securely connecting the pressure helmet 30 to the suit 28, a pressure transfer system (PTS) 34, and breathing assist means 36.

The buoyancy suit utilized includes at least two layers of flexible material, each layer being relatively impermeable to a substantially compressible fluid having a specific gravity approximating blood being locatable in a space between the layers. The suit fits over substantially the entire subject. As discussed above, the buoyancy force suit 28 is of the type disclosed and claimed in U.S. Pat. No. 4,925,133, entitled "Hydraulic Buoyancy Force Suit", assigned to the present assignee. U.S. Pat. No. 4,925,133 is incorporated herein by reference and the details will therefore not be repeated here.

Referring now to FIG. 3A, a pressure helmet 30 is illustrated for supporting the subject's head with a gas pressure force. The helmet includes an outer shell 38 which is relatively impermeable to gases comprised of air, oxygen, nitrogen or helium. Connecting means 32 (FIG. 313) comprises two connection racks, a first connection rack 40 attached to the base perimeter of the helmet 30 and a second connection rack 42 connected to the perimeter of the suit collar 44, as illustrated in FIGS. 3A, 4A and 4B. A pressure seal or flap 46 is provided between the subject's neck 48 and the connection rack 42 to maintain an independent pressure within the helmet.

Figure 5:
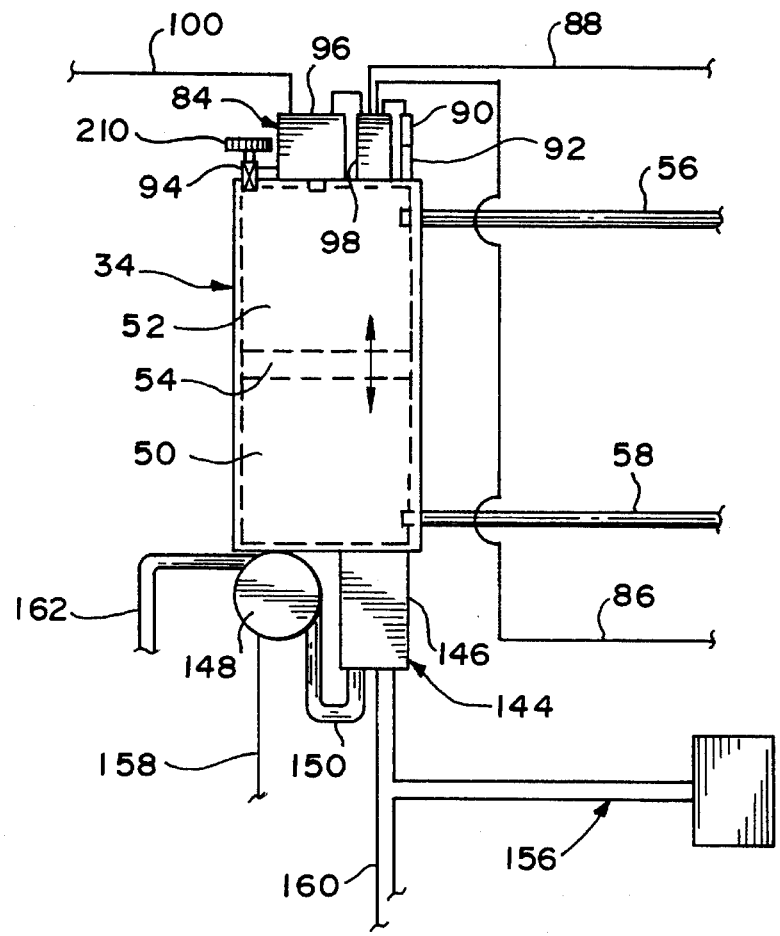
FIG. 5 is a side view of the pressure transfer system, pressure regulator system and the thermal management system of the present invention.

Referring now to FIG. 5, a preferred embodiment of the pressure transfer system (PTS) 34 (FIG. 1) of the present invention is illustrated. PTS 34 provides pressure transfer and equalization between the suit 28 (FIG. 1) and pressure helmet 30 (FIG. 1). PTS 34 is comprised of a fluid reservoir segment 50 and a gas reservoir segment 52. The fluid segment 50 is in fluid communication with the space between the layers of the buoyancy force suit 28 for maintaining a substantially constant fluid level within the suit 28 at all times (as will be discussed in detail below). The gas segment 52 is in gas communication with space internal to the pressure helmet 30 for maintaining gas pressure force in the helmet 30 substantially equivalent to fluid pressure within the fluid segment 50 of the PTS 34. Suitable means 54 separate the fluid and gas reservoir segments 50, 52 and maintain the segments in pressure communication with each other without physical mixing of the fluid and gas substances of either reservoir segment. Separating means 54 may, for example, include a floating piston an elastic membrane or other conventional means. Helmet gas transfer line 56 provides gas communication with the helmet 30. Suit input liquid flow line 58 provides liquid communication with the suit 28.

Figure 6:
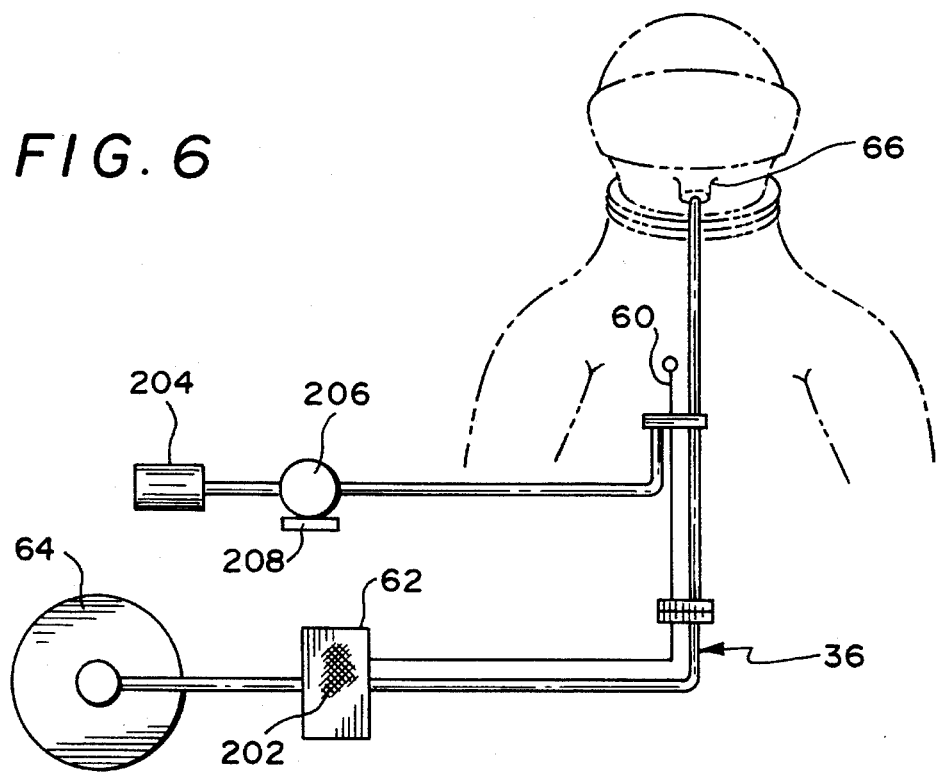
FIG. 6 is a schematic illustration of the breathing assist means and CBR system of the present invention.

Referring now to FIG. 6, the breathing assist means (BAM) 36 is illustrated. BAM 36 includes a pressure sensing and transducing means 60 in fluid communication with the fluid between the layers of the force suit 28, located at the chest level. Means 60 senses hydrostatic pressure applied to the lungs by the fluid of the force suit 28 under acceleration conditions. Pressure sensing and transducing means 60 also converts the hydrostatic pressure force to electronic current output for transmitting the suit hydrostatic pressure electronically to a pressure regulator means 62. Pressure regulator means 62 is in gas communication with the breathing gas supply and with an oronasal face mask 66 for regulating flow of the breathing gas supply 64 to the face mask 66 at a pressure substantially equal to the pressure output generated by the pressure sensing and transducing means 60. The pressure that the pressure regulator 62 feeds to the face mask 66 is never greater than the maximum acceptable pressure for precluding lung rupture.

As may be seen in FIGS. 3A and 3B, the oronasal face mask 66 is integrated into the pressure helmet 30 for providing pressurized breathing gas at pressures independent of the pressure within the pressure helmet. The face mask 66 includes a two-way pressure flap 68 which prevents flow or leakage of pressurized gas from around the perimeter of the mask 66 either into or out of the mask. An exhaust valve 70 is included for providing a means for exhausting exhaled gas out of the mask 66 and into the surrounding ambient environment.

The valsalva buttons 72 are provided for occluding the nasal passages to perform the valsalva maneuver during periods of pressure change. A drinking interface means or drinking port 74 allows access to a drinking source as desired by the subject and further provides a seal that is relatively impermeable to pressurized gases including air, oxygen, nitrogen, or helium in addition to chemical, biological, and radiation substance threats when not in use. Two mask venting lines 76, 78 are integrated into the structure of the mask 66 and are in gas communication with the breathing gas supply 64 (FIG. 6) and space internal to the pressure helmet 30 with the output of the lines 76, 78 being locatable at approximately the bottom of the helmet visor 80 and either side of the nose for redirecting a relatively small amount of pressurized breathing gas to the visor 80. This precludes condensation from building up on the visor 80. An anti-suffocation valve 82 is provided for allowing ambient air to flow into the mask 66 during the subject's inhalation, in the event that the breathing gas supply is interrupted or blocked.

Referring again to FIG. 5, it is seen that the present invention includes a high altitude protection (HAP) system comprising a pressure regulator system (PRS), designated generally as 84, in gas communication with the gas segment 52 of the PTS 34 for providing a minimum threshold pressure necessary to sustain useful consciousness of the subject, and preclude the onset of tissue ebullism under conditions of high altitude and low ambient pressure. The PRS 84 maintains the minimum threshold pressure within the PTS 34 under the forces of acceleration as imposed on the PTS system with substantial components in the $+G_z$, $-G_z$, and zero $G_z$ directions. The PRS 84 comprises a suit hydrostatic pressure sensor 86, a helmet pressure sensor 88, and ambient pressure sensor 90, a gravity field strength measuring sensor 92, pressure relief means 94, pressure pump means 96, and controller means 98. The suit hydrostatic pressure sensor 86 senses and measures hydrostatic pressure of the fluid between the layers of the suit where the hydrostatic pressure directly affects pressure transfer from the fluid segment 50 of the PTS 34 to the gas segment 52 via the segment separation means 54 under acceleration conditions.

The helmet pressure sensor 88 senses and measures gas pressure within the pressure helmet as affected by any hydrostatic pressure transfer through the PTS 34 under acceleration conditions.

Ambient pressure sensor 90 senses and measures ambient gas pressure of the environment outside of this suit 28, pressure helmet 30, and PTS 34 under acceleration conditions. The gravity field strength measuring sensor 92 senses and measures the gravity field strength within the environment that the PTS 34 and PRS 84 are exposed under acceleration conditions. Pressure relief means 94 provides gas communication between the gas segment 52 of the PTS 34 and the ambient environment. Pressure pump means 96 is in gas communication with the gas segment 52 for increasing the gas pressure within the PTS 34. Controller means 98 coordinates the sequence of actions of the pressure relief means 94 and pressure pump means 96 based on gathered measures of the suit hydrostatic pressure, helmet gas pressure, ambient gas pressure, and gravity field strength. An aircraft power supply lead 100 provides power to the PRS 84 from the aircraft power supply (not shown).

Figure 7:
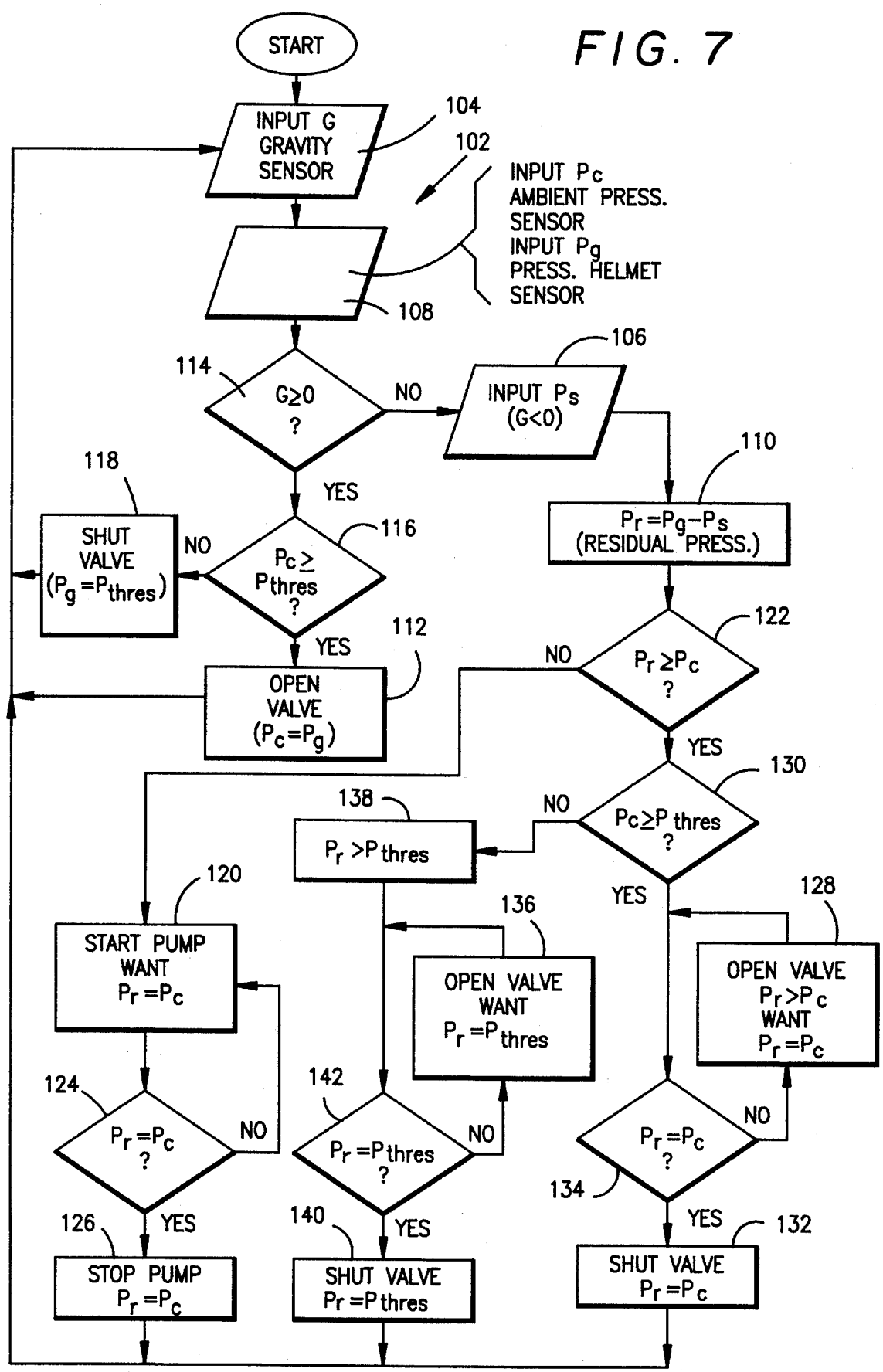
FIG. 7 is a logic diagram of the controller of the pressure regulator system of the present invention.

Referring now to FIG. 7, the sequence logic, designated generally as 102, of the controller 98, is illustrated which monitors, activates, and controls the PRS 84. The input from the gravity field strength sensor 92 is quantified to determine gravity field strength and direction in terms of $+G_z$, $-G_z$ or zero, as shown in block 104. The input from the suit hydrostatic pressure sensor 86 is quantified as it directly affects pressure transfer through the PTS 34 to the pressure helmet under acceleration conditions, as shown in block 106. Input from the pressure helmet pressure sensor 88 is quantified as it indicates total pressure within the PTS 34, as shown in block 108. The difference in the suit hydrostatic pressure and total pressure within the PTS, as measured by the helmet pressure sensor, is quantified as the residual pressure within the PTS 34, as shown in block 110. The input from the ambient pressure sensor is quantified to determine if it is above, at, or below the minimum threshold pressure necessary to preclude ebullism, as also shown in block 108. As shown in block 112, pressure relief means 94 is activated under the combined conditions of $+G_z$ or zero $G_z$ acceleration component as tested under the decision block 114, and ambient pressures greater than the minimum threshold pressure, as shown in decision block 116. The pressure relief means 94 is stopped, as shown in block 118, under the combined conditions of $+G_z$ or zero $G_z$ acceleration component, as shown in decision block 114, and ambient pressures equal to or less than the minimum threshold pressure, as shown in decision block 116.

The PRS pressure pump means 96 is activated, as shown in block 120, under the combined conditions of negative $G_z$ acceleration component as defined in decision block 114 and increasing ambient pressure greater than the residual pressure, as defined in decision block 122, to maintain equality between the quantified ambient pressure and quantified residual pressure within the PTS, as defined by decision block 124 independent of the suit hydrostatic pressure, as quantified under $-G_z$ acceleration component conditions. As shown by block 126, pressure pump means 96 is stopped under combined conditions of $-G_z$ acceleration component as defined in decision block 114 and constant ambient pressure greater than the minimum threshold pressure in where equality exists between the quantified ambient pressure and the quantified residual pressure within the PTS, as shown in block 124, independent of suit hydrostatic pressure as quantified under negative $G_z$ acceleration component conditions.

Pressure relief means 94 is activated, as shown in block 128, under the combined conditions of $-G_z$ acceleration component and the quantified residual pressure greater than the quantified ambient pressure, as shown in decision block 122, and the ambient pressure greater than the minimum threshold pressure, as shown in decision block 130. As shown in block 132, the pressure relief means 94 is shut under the combined conditions of $-G_z$ acceleration component, and ambient pressure greater than or equal to the minimum threshold pressure as depicted in decision block 130, and the quantified residual pressure is equal to the quantified ambient pressure, as shown in decision block 134.

Pressure relief means 94 is activated as shown in block 136 under the combined conditions of $-G_z$ acceleration component and quantified residual pressure greater than the quantified ambient pressure, as defined in decision block 122, and the ambient pressure less than the minimum threshold pressure, as defined in decision block 130, and the residual pressure is greater than the minimum threshold pressure as defined in block 138. Pressure relief means 94 is shut as shown in block 140 under combined conditions of $-G_z$ acceleration component and the quantified residual pressure is equal to the minimum threshold pressure, as shown in decision block 142.

The pressure relief means 94 allows pressurized gas to flow out of the PTS 34 under the combined conditions of zero or $+G_z$ acceleration component and decreasing ambient pressure which is still greater than the minimum threshold pressure necessary to preclude ebullism. The pressure relief means 94 also allows pressurized gas to flow into the PTS 34 under the combined conditions of zero or $+G_z$ acceleration component and increasing ambient pressure which is still greater than the minimum threshold pressure necessary to preclude ebullism. The pressure relief means then stops pressurized gas flow out of the PTS 34 once the residual pressure in the PTS, independent of the suit hydrostatic pressure as influenced by zero or $+G_z$ acceleration component conditions, reaches the minimum threshold pressure necessary to preclude ebullism.

The pressure pump means 96 adds pressurized gas to the PTS 34 under combined conditions of zero or $-G_z$ acceleration component and increasing ambient pressure to maintain a quantified residual pressure within the PTS, independent of the force suit hydrostatic pressure as influenced by zero or $-G_z$ acceleration component conditions, that is equal to the quantified ambient pressure, or at least, maintaining the minimum threshold pressure necessary to preclude ebullism.

Referring again to FIG. 5, a thermal management system (TMS) of the present invention is illustrated, designated generally as 144. TMS 144 is in fluid communication with the fluid between the layers of the buoyancy suit 28, and with the fluid segment 50 of the PTS 34 for monitoring and circulating the fluid throughout the suit and PTS 34 at prescribed temperature levels for maintaining subject comfort under nominal conditions and preventing subject hypothermia and hyperthermia under conditions of extreme ambient temperatures.

TMS 144 includes a heat exchanger 146 in fluid communication with a fluid pump 148 and the force suit 28 for exchanging heat with the fluid between the layers of the suit to control temperature within the layers of the suit, thereby maintaining a safe temperature condition for the subject. The fluid pump 148 is also in fluid communication with the heat exchanger 146 via a pump liquid transfer line 150 and the fluid segment 50 of the PTS for providing fluid flow through the heat exchanger 146 to the PTS 34. Fluid pump 148 further provides circulation of temperature regulated fluid throughout the layers of the suit.

Figure 9:
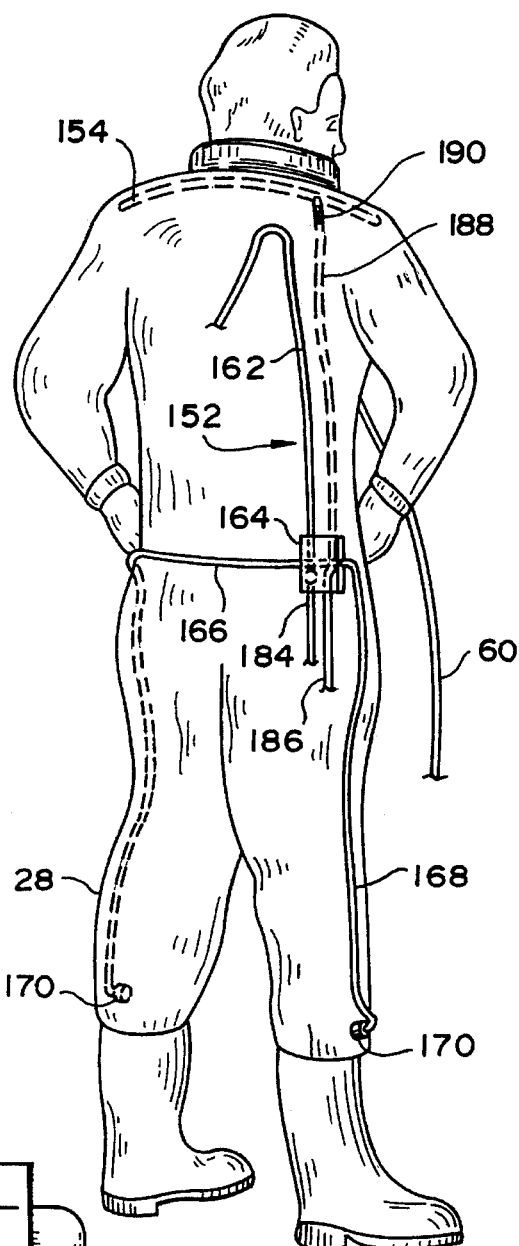
FIG. 9 is a back view of the crew member wearing the buoyancy force suit and showing the lay out of the various liquid flow lines.

Referring now to FIG. 9, it can be seen that TMS 144 includes liquid flow lines, designated generally as 152, for providing a contained flow path to channel fluid from the force suit 28 to the fluid pump 148 and from the fluid segment 50 of the PTS to the suit 28, thereby providing circulation of temperature regulated fluid throughout the suit. A flow distribution means 154 is in fluid communication with the fluid segment 50 of the PTS via the suit input liquid flow line 58 (shown in FIG. 5). The flow distribution means 154 is located between layers of the suit for distributing pumped fluid flow from the pump 148 within the layers of the suit.

Referring back to FIG. 5, a fluid temperature sensing indicating and adjustment means, designated generally as 156, monitors temperature of the fluid between the layers of the suit 28 and adjusts the heat exchange rate of the heat exchanger 146, thereby allowing control of the temperature of the fluid in the suit 28. Aircraft pump power lead 158 and aircraft heat exchange power lead 160 provide power to the pump 148 and the heat exchanger 146, respectively, from the aircraft power supply.

Referring to FIG. 9, liquid flow lines 152 are comprised of a first line segment 162 attached to the fluid pump 148 at one end and a fluid flow line junction box 164 at the other, and second and third line segments 166, 168 attached to the fluid flow line junction box 164 and extending down either leg for providing fluid flow from substantially the bottom of the suit 28 to the fluid flow line junction box 164, and from the fluid flow line junction box 164 to the first line segment 162 to the fluid pump 148. Fluid collection means 170 are attached to each leg of the force suit 28 and further attached to the second and third liquid flow line segments 166, 168 for facilitating fluid flow from substantially the bottom of the suit to the liquid flow lines and throughout the TMS.

Figures 8A, 8B:
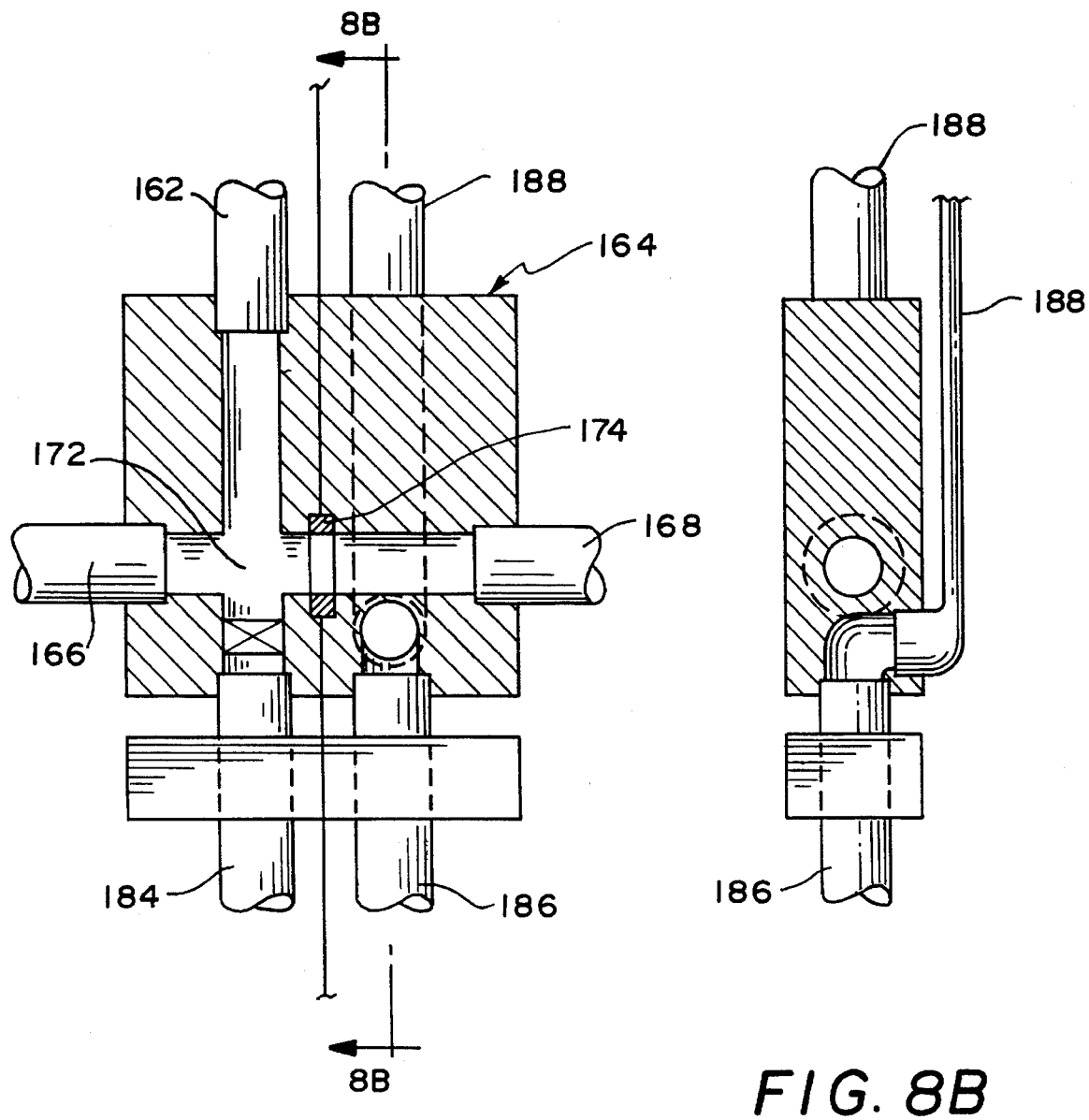
FIG. 8A is a front cross sectional view of the fluid flow junction box of the present invention.
FIG. 8B is a view taken along line 8B—8B of FIG. 8A.

The fluid flow line junction box 164 is shown in detail in FIGS. 8A and 8B. It further joins fluid flow from the second and third flow line segments 166, 168 extending up the legs to the first liquid flow line segment 162 extending to the fluid pump. Point 172 is the location where the junction box 164 joins the fluid flow. Temperature sensing means 174 of the temperature sensing, indicating and adjustment means 156 is located within the fluid flow line junction box 164 for sensing and transducing fluid temperature within either the second or third liquid flow line segments 166, 168 to electronic current output.

Referring now to FIG. 5, the temperature sensing, indicating and adjusting means 156 is in electronic communication with the heat exchanger and is locatable to a position both visible and reachable to the subject for providing the subject with the ability to change the heat exchange rate of the heat exchanger 146.

Figure 10:
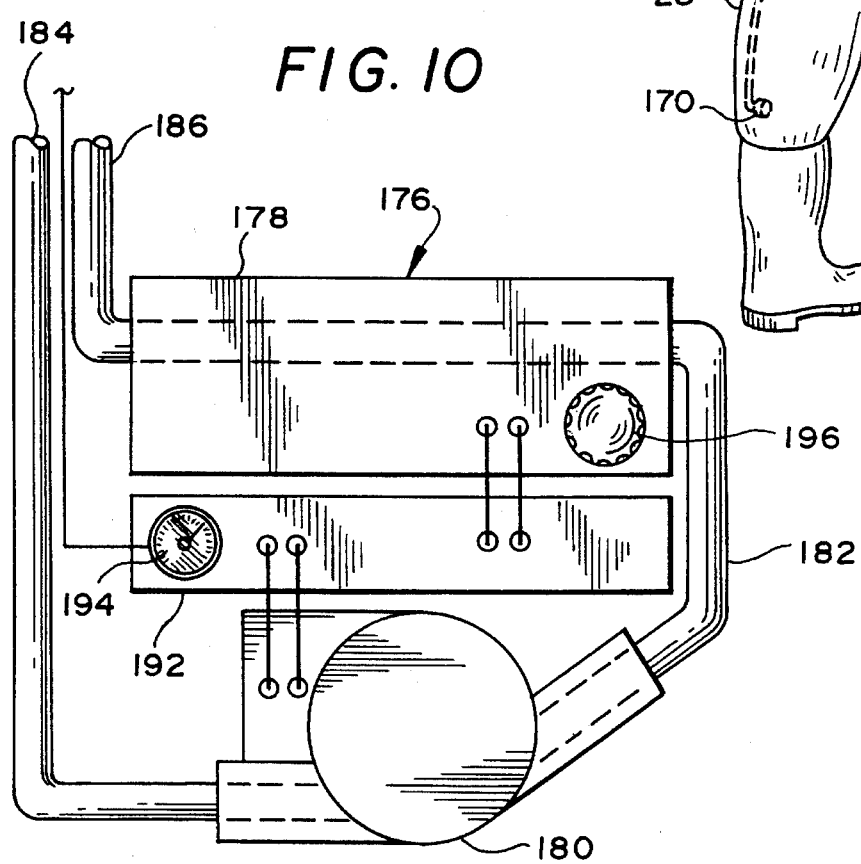
FIG. 10 a top view of the emergency thermal management system of the present invention.

Referring now to FIG. 10, an emergency thermal management system (ETMS), designated generally as 176, is shown which provides temperature regulatable flow of the fluid between the layers of the force suit 28, thereby extending protection to the subject from hypothermia and hyperthermia under conditions of extreme ambient temperatures occurring after emergency escape and separation from the escape system, including cold water immersion in a saline environment. ETMS 176 includes an emergency heat exchanger 178 for exchanging heat with the fluid between the layers of the suit to control temperature. An emergency fluid pump 180 in fluid communication with the emergency heat exchanger 178 via an emergency liquid transfer line 182 provides fluid flow through the emergency heat exchanger 178.

Referring again now to FIG. 8A, a fourth liquid flow line segment 184 is attached to the fluid flow line junction box 164 at one end and to the emergency fluid pump 180 at the other end for channeling flow into the emergency pump. A fifth liquid flow line segment 186 is attached at the output of the emergency heat exchanger 178 and leads to the fluid flow line junction box 164 for providing a flow path out of the emergency heat exchanger to the fluid flow line junction box. A sixth liquid flow line segment 188 is attached to the fluid flow line junction box and extends into the force suit 28 leading to the flow distribution means 154 for channeling fluid from the fluid flow line junction box to the flow distribution means. Thus, a contained flow path is provided to channel temperature regulated fluid throughout the suit and the ETMS.

Referring again to FIG. 9, a fluid flow control means 190 is shown which provides an interface between the sixth liquid flow line segment 188 and the flow distribution means 154 for allowing only one direction of fluid flow that is from the sixth liquid flow line segment 188 into the flow distribution means, thereby precluding fluid flow into the sixth liquid flow line segment 188 from the flow distribution means 154.

Referring to FIG. 10 an emergency power supply 192 is illustrated which is in electronic communication with the emergency heat exchanger means 178 and the emergency fluid pump 180 for providing temporary operating power to the ETMS 176 during emergency escape and recovery conditions, including extended cold water immersion in a saline environment.

An emergency temperature indicator 194 is in electronic communication with the temperature sensing means 174 contained within the fluid flow junction box 164. Emergency temperature indicator 194 is locatable at the emergency power supply 192 for providing the subject with a visual indication of temperature. Emergency temperature adjustment means 196 is in electronic communication with the emergency heat exchanger 178 for providing temperature regulation of the fluid flow between the layers of the suit at a preselected safe temperature level, thereby precluding the requirement for subject consciousness to activate and adjust desired temperature after emergency escape. The emergency temperature adjustment means further provides the ability to override the preselected temperature by the subject after emergency escape.

Thus, the fluid collection means 170 collects and channels the fluid from the collection means to the fluid flow junction box 164 and channels the fluid from the fluid flow junction box into the emergency pump 180 and emergency heat exchanger 178. It further channels the fluid out of the emergency heat exchange back to the fluid flow junction box and channels fluid from the fluid flow junction box through the fluid flow control means 190 to the flow distribution means 154 and finally distributes the fluid between the layers of the suit. This provides circulation of temperature controlled fluid throughout this suit under such emergencies escape conditions.

Referring back to FIG. 2, the present system preferably uses chemical, biological and radiation (CBR) impermeable materials 198 incorporated into the outer layer of the suit 28 to preclude penetration of CBR substances through the Outer layer, thereby preventing contamination of the fluid between the layers of the suit and the subject. The CBR impermeable materials are also preferably incorporated into the outer shell of the pressure helmet, as shown by numeral designation 200, to preclude penetration of CBR substances into the space within the helmet. Additionally, the PTS 34, TMS 144 and ETMS 176 also preferably incorporate such CBR impermeable materials at their outer surface.

Referring now to FIG. 6, it is also noted that CBR impermeable materials may be incorporated into the outer surface of BAM 36, as shown by numeral designation 202. A CBR filter 204 is in gas communication with an air blower 206 and the breathing assist means 36 for filtering out chemical and biological contaminants and radiation fallout from ambient atmospheric gases circulated to the subject by the air blower 206 during nominal ground, ingress and egress operations, and during emergency egress and escape. The air blower 206 facilitates flow of ambient gases through the CBR filter 204 and to the BAM 36. A CBR power supply 208 is in electronic communication with the air blower 206 for providing power to the blower.

Referring back now to FIG. 5, a second CBR filter 210 is shown in gas communication with the pressure regulator system 84 and the ambient atmospheric gases for filtering chemical and biological substances and radiation fallout from the ambient atmospheric gases used to pressurize the gas segment 52 of the PTS 34.

As shown in FIG. 2, CBR foot covers 212 may be utilized which are attached to the legs of the suit 28. Additionally, CBR gloves 214 and a visor 80 may be utilized with CBR impermeable materials. The visor should be relatively impermeable to gases comprised of air, oxygen, nitrogen or helium. Visor 80 is also used to filter out or completely reflect directed laser energy flash from laser threat sources, thereby reducing or precluding laser energy from reaching the subject's eyes.

Referring now to FIG. 3A, a pressure release valve 216 is provided for relieving pressurization of the pressure helmet when pressure within the gas segment of the PTS reaches or exceeds the safe maximum pressure necessary to preclude pressure induced injury to the subject. Pressure release valve 216 is preferably adjustable so as to allow the subject the capability to preselect the maximum pressure value necessary to stop pressurization of the pressure helmet, the adjustability falling within the range of acceptable safe pressure values.

Obviously, many modifications and variations of the present invention are possible in light of the above teachings. It is therefore to be understood that, within the scope of the appended claims, the invention may be practiced otherwise than as specifically described.

We claim:

1. An apparatus for maintaining useful consciousness and reducing the risk of injury for a subject exposed to high levels of acceleration with substantial components in the $+G_z$ or $-G_z$ direction while in a vehicle, comprising:

a) a buoyancy force suit for supporting said subject with a buoyancy force, said force suit including at least two layers of flexible material, each layer being relatively impermeable to a substantially incompressible fluid having a specific gravity approximating blood being locatable in a space between said layers, said suit for fitting over substantially the entire subject;

b) a pressure helmet for supporting said subject's head with a gas pressure force, said helmet including an outer shell relatively impermeable to gases comprised of air, oxygen, nitrogen, or helium, said helmet for fitting entirely over the subject's head;

c) means for securely connecting said pressure helmet to said suit for creating a pressure seal and maintaining a positive pressure in the helmet;

d) a Pressure Transfer System (PTS) for providing pressure transfer and equalization between said suit and said pressure helmet and for providing $-G_z$ force protection, said PTS comprising of a fluid reservoir segment and a gas reservoir segment, said fluid segment in fluid communication with the space between the layers of said buoyancy force suit for maintaining a substantially constant fluid level within said suit at all times, said gas segment in gas communication with space internal to said pressure helmet, said gas segment for applying pressure to the user's head, for maintaining gas pressure force to the user's head in said helmet substantially equivalent to fluid pressure within said fluid segment of the PTS and for providing $-G_z$ force protection, said PTS further including a means for separating said fluid and said gas reservoir segments and maintaining said segments in pressure communication with each other without physical mixing of the fluid and gas substances of either reservoir segment, and;

e) a breathing assist means (BAM) for sensing the pressure of said fluid within said force suit at the subject's chest level, said BAM including an oronasal face mask extending into said helmet for providing breathing gas to the subject at pressures substantially equal to said chest level fluid pressure, said breathing gas being provided by gas conduit means being independent of said pressure which is being applied to said user's head by said gas segment of said gas pressure transfer system, said oronasal face mask precluding gas communication between said breathing Gas and said gas being applied to the user's head within said pressure helmet.

2. The apparatus of claim 1 further including a High Altitude Protection (HAP) system comprising a Pressure Regulator System (PRS) in gas communication with said gas segment of said PTS for providing a minimum threshold pressure necessary to sustain useful consciousness of the subject, and preclude the onset of tissue ebullism under conditions of high altitude and low ambient pressure.

3. The apparatus of claim 2 wherein said PRS maintains said minimum threshold pressure within said PTS under the forces of acceleration as imposed on the PTS system with substantial components in the $+G_z$, $-G_z$, and zero $G_z$ directions, said PRS comprising:

a) a suit hydrostatic pressure sensor for sensing and measuring hydrostatic pressure of said fluid between said layers of said suit where said hydrostatic pressure directly effects pressure transfer from said fluid segment of said PTS to said gas segment of said PTS via said segment separation means under acceleration conditions;

b) a helmet pressure sensor means for sensing and measuring gas pressure within said pressure helmet as affected by any hydrostatic pressure transfer through said PTS under acceleration conditions;

c) an ambient pressure sensor means for sensing and measuring ambient gas pressure of the environment outside of said suit, pressure helmet, and PTS under said acceleration conditions;

d) a gravity field strength measuring sensor for sensing and measuring the gravity field strength within an environment that said PTS, and said PRS are exposed for said acceleration conditions;

e) pressure relief means for providing gas communication between said gas segment of said PTS and said ambient environment;

f) pressure pump means in gas communication with said gas segment of said PTS for increasing the gas pressure within said PTS; and g) controller means for coordinating the sequence of actions of said pressure relief means and pressure pump means based on gathered measures of said suit hydrostatic pressure, helmet gas pressure, ambient gas pressure, and gravity field strength, 4. The apparatus of claim 3 wherein said controller means is further in electronic communication with said pressure sensors, gravity field strength measuring sensor, pressure relief means, and pressure pump means, said controller means containing sequence logic means for monitoring, activating, and controlling said PRS.

5. The apparatus of claim 4 wherein said sequence logic means comprises:

a) means for quantifying input from said gravity field strength sensor to determine gravity field strength in forms of $+G_z$, $-G_z$, or zero $G_z$ components;

b) means for quantifying input from said suit hydrostatic pressure sensor as it directly effects pressure transfer through said PTS to said pressure helmet under said acceleration conditions;

c) means for quantifying input from said pressure helmet pressure sensor as it indicates total pressure within said PTS;

d) means for quantifying residual pressure within said PTS as the difference in said suit hydrostatic pressure and total pressure within said PTS as measured by said helmet pressure sensor and directly correlated to total pressure within said PTS;

e) means for quantifying input from said ambient pressure sensor to determine if it is above, at, or below the minimum threshold pressure necessary to preclude ebullism;

f) means for activating said pressure relief means under the combined conditions of said $+G_z$ or zero $G_z$ acceleration component and ambient pressures greater than said minimum threshold pressure;

g) means for stopping said pressure relief means under the combined conditions of $+G_z$ or zero $G_z$ acceleration component and ambient pressures equal to or less than said minimum threshold pressure;

h) means for activating said PRS pressure pump means under combined conditions of $-G_z$ acceleration component and increasing ambient pressure to maintain equality between said quantified ambient pressure and said quantified residual pressure within said PTS, independent of suit hydrostatic pressure as quantified under $-G_z$ acceleration component conditions;

i) means for stopping said PRS pressure pump means under combined conditions of $-G_z$ acceleration component and constant ambient pressure greater than said minimum threshold pressure where equality exists between said quantified ambient pressure and said quantified residual pressure within the PTS, independent of suit hydrostatic pressure as quantified under $-G_z$ acceleration component conditions;

j) means for activating said pressure relief means under combined conditions of $-G_z$ acceleration component and said quantified residual pressure within said PTS greater than said quantified ambient pressure, and said ambient pressure greater than said minimum threshold pressure;

k) means for stopping said pressure relief means under combined conditions of $-G_z$ acceleration component and said quantified residual pressure within said PTS equal to said quantified ambient pressure, and said ambient pressure greater than said minimum threshold pressure;

l) means for stopping said pressure relief means under combined conditions of $-G_z$ acceleration component and said quantified residual pressure within said PTS equal to said quantified ambient pressure, and said ambient pressure equal to said minimum threshold pressure;

m) means for activating said pressure relief means under combined conditions of $-G_z$ acceleration component and said quantified residual pressure within said PTS greater than said quantified ambient pressure, and said ambient pressure less than said minimum threshold pressure and said residual pressure is greater than the minimum threshold pressure; and n) means for stopping said pressure relief means under combined conditions of $-G_z$ acceleration component and said quantified residual pressure within said PTS equal to said minimum threshold pressure.

6. The apparatus of claim 5 wherein said pressure relief means is further in electronic communication with said controller means in said PRS for allowing pressurized gas flow out of said PTS under the combined conditions of zero or $+G_z$ acceleration component and decreasing ambient pressure still greater than the minimum threshold pressure necessary to preclude ebullism, and for allowing pressurized gas to flow into said PTS under the combined conditions of zero or $+G_z$ acceleration component and increasing ambient pressure still greater than the minimum threshold pressure necessary to preclude ebullism, and for stopping further pressurized gas flow out of the PTS once the residual pressure in the PTS, independent of said suit hydrostatic pressure as influenced by zero or $+G_z$ acceleration component conditions, reaches said minimum threshold pressure necessary to preclude ebullism.

7. The apparatus of claim 5 wherein said pressure pump means is further in electronic communication with said controller means and in gas communication with said pressure relief means for adding pressurized gas to said PTS under combined conditions of zero or $-G_z$ acceleration component and rising ambient pressure thereby maintaining said quantified residual pressure within said PTS, independent of said force suit hydrostatic pressure as influenced by zero or $-G_z$ acceleration component conditions, that is equal to said quantified ambient pressure, or at the least maintaining said minimum threshold pressure necessary to preclude ebullism.

8. The apparatus of claim 1 further including a Thermal Management System (TMS) in fluid communication with said fluid between the layers of said suit, and with said fluid segment of said PTS for monitoring and circulating said fluid throughout said suit and said PTS at prescribed temperature levels for maintaining subject comfort under nominal conditions and preventing subject hypothermia and hyperthermia under conditions of extreme ambient temperatures, comprising:

a) heat exchanger means in fluid communication with a fluid pump means and said force suit for exchanging heat with said fluid between the layers of said suit to control temperature within the layers of said suit thereby maintaining a safe temperature condition for the subject;

b) said fluid pump further in fluid communication with said heat exchanger means via a pump liquid transfer line and said fluid segment of said PTS for providing fluid flow through said heat exchanger means to said PTS, and further for providing circulation of temperature regulated fluid throughout said layers of said suit;

c) liquid flow lines for providing a contained flow path to channel fluid from said force suit to said fluid pump and from said liquid segment of PTS to said suit thereby providing circulation of temperature regulated fluid throughout the suit;

d) flow distribution means in fluid communication with said fluid segment of said PTS via a suit input liquid flow line being locatable between said layers of said suit for distributing pumped fluid flow from said pump means within the layers of said suit; and, e) fluid temperature sensing, indicating and adjusting means for monitoring temperature of said fluid between the layers of said suit and for adjusting the heat exchange rate of said heat exchanger means thereby allowing control of the temperature of said fluid in said suit.

9. The apparatus of claim 8, wherein said liquid flow lines comprised of a first line segment a second line segment, and a third line segment are further attached to the outer layer of said suit, the first line segment attached to said fluid pump means at one end and a fluid flow line junction box at the other, and 2nd, 3rd line segments attached to said fluid flow line junction box and extending down either leg for providing fluid flow from substantially the bottom of the suit to said fluid flow line junction box, and from said fluid flow line junction box to said 1st line segment to said fluid pump.

10. The apparatus of claim 9 further comprising fluid collection means attached to each leg of said force suit, and further attached to the 2nd and 3rd liquid flow line segments for facilitating fluid flow from substantially the bottom of the suit to said liquid flow lines and throughout said TMS.

11. The apparatus of claim 9 wherein said fluid flow line junction box further joins fluid flow from said 2nd and 3rd flow line segment extending up the legs to 1st flow line segment extending to the fluid pump means.

12. The apparatus of claim 9 wherein said temperature sensing, indicating and adjusting means comprises a temperature sensor being locatable within said fluid flow line junction box for sensing and transducing fluid temperature within either the 2nd or 3rd liquid segments to electronic current output.

13. The apparatus of claim 9 wherein said temperature sensing, indicating and adjusting means is in electronic communication with said heat exchanger means and is locatable to a position both visible and reachable to said subject for providing said subject the ability to change said heat exchange rate of said heat exchanger means.

14. The apparatus of claim 9 further including an Emergency Thermal Management System (ETMS) for providing temperature regulatable flow of said fluid between the layers of said force suit thereby extending protection to said subject from hypothermia and hyperthermia under conditions of extreme ambient temperatures occurring after emergency escape and separation from the escape system, including cold water immersion in a saline environment.

15. The apparatus of claim 14 further including an emergency heat exchanger means for exchanging heat with said fluid between the layers of said suit to control temperature within the layers of said suit thereby maintaining tolerable temperature conditions during emergency escape and recovery, including water immersion in a saline environment.

16. The apparatus of claim 15 further comprising an emergency fluid pump means in fluid communication with said emergency heat exchanger means via an emergency liquid transfer line for providing fluid flow through said emergency heat exchanger means, further providing circulation of temperature regulated flow of said fluid between the layers of said suit and throughout said ETMS.

17. The apparatus of claim 15 further including 4th, 5th and 6th liquid flow line segments for providing a contained flow path to channel temperature regulated fluid throughout said suit and said ETMS, said 4th liquid flow line segment attached to said fluid flow line junction box at one end and to said emergency fluid pump means at the other end for channeling flow into said emergency pump means, said 5th liquid flow line segment attached at the output of said emergency heat exchanger means and leading to said fluid flow line junction box for providing a flow path out of said emergency heat exchanger means to said fluid flow line junction box, said 6th liquid flow line segment attached to said fluid flow line junction box and leading to said flow distribution means for channeling fluid from said fluid flow line junction box to said flow distribution means.

18. The apparatus of claim 17 wherein said fluid flow line junction box joins fluid flow from both said 2nd and 3rd liquid flow line segments to said 4th liquid flow line segment and further joining said 5th liquid flow line segment to said 6th liquid flow line segment.

19. The apparatus of claim 18 further including a fluid flow control means for providing an interface between said 6th liquid flow line segment and said flow distribution means for allowing only one direction of fluid flow, that is from said 6th liquid flow line segment into said flow distribution means, thereby precluding fluid flow into said 6th liquid flow line segment from said flow distribution means.

20. The apparatus of claim 19 further including an emergency power supply means in electronic communication with said emergency heat exchanger means and said emergency fluid pump means for providing temporary operating power to said ETMS during emergency escape and recovery conditions including extended cold water immersion in a saline environment.

21. The apparatus of claim 20 further including an emergency temperature indicator means in electronic communication with said temperature sensing means and being locatable at said emergency power supply means of said ETMS for providing said subject with a visual indication of temperature.

22. The apparatus of claim 21 further including emergency temperature adjustment means in electronic communication with said emergency heat exchanger for providing temperature regulation of said fluid flow between said layers of said suit at a preselected safe temperature level thereby precluding the requirement for subject consciousness to activate and adjust desired temperature after emergency escape, said emergency temperature adjustment means further providing a means to override said preselected temperature by said subject after emergency escape.

23. The apparatus of claim 22 wherein said fluid collection means collects and channels said fluid from said collection means to said fluid flow junction box and further channels said fluid from said fluid flow junction box into said emergency pump means and said emergency heat exchanger means and further channels said fluid out of said emergency heat exchanger means back to said fluid flow junction box, and further channels said fluid from said fluid flow junction box through said fluid flow control means to said flow distribution means and finally for distributing said fluid between the layers of said suit thereby providing circulation of temperature controlled fluid throughout said suit under emergency escape conditions including extended cold water immersion in a saline environment.

24. The apparatus of claim 14 further incorporating CBR impermeable materials into outer surfaces of said ETMS to preclude penetration of said CBR substances into said ETMS thereby preventing CBR contamination of said fluid between the layers of said suit, and of said subject.

25. The apparatus of claim 8 further incorporating CBR impermeable materials into outer surfaces of said TMS to preclude penetration of said CBR substances into said TMS thereby preventing CBR contamination of said fluid between the layers of said suit, and of said subject.

26. The apparatus of claim 1 wherein said breathing assist means (BAM) further includes a pressure sensing and transducing means in fluid communication with the space between the layers of said force suit, approximately located at the chest level, for sensing hydrostatic pressure applied to the lungs by any fluid in said force suit under acceleration conditions, said pressure sensing and transducing means further for converting said hydrostatic pressure force to electronic current output for transmitting said suit hydrostatic pressure electronically to a pressure regulator means.

27. The apparatus of claim 26 wherein said BAM further includes pressure regulator means in electronic communication with said pressure sensing and transducing means and in gas communication with a breathing gas supply and said oronasal face mask for regulating flow of said breathing gas supply to said face mask at a pressure substantially equal to the pressure output generated by said pressure sensing and transducing means, but never greater than the maximum acceptable pressure for precluding lung rupture.

28. The apparatus of claim 27 wherein said oronasal face mask is integrated into said pressure helmet for providing said pressurized breathing gas at pressures independent of the pressure within said pressure helmet, said face mask comprising:

a) means for occluding the nasal passages to perform the valsalva maneuver during periods of pressure change, said means being accessible by the subject while operating within said suit;

b) a drinking interface means for providing access to a drinking source as desired by the subject, and further providing a seal that is relatively impermeable to pressurized gases including air, oxygen, nitrogen, or helium in addition to chemical, biological, and radiation substance threats when not in use;

c) two mask venting lines integrated into the structure of said mask and in gas communication with said breathing gas supply and said space internal to the pressure helmet with the output of said channels being locatable at approximately the bottom of a helmet visor and on either side of the subject's nose for redirecting a relatively small amount of pressurized breathing gas to said visor, thereby precluding condensation from building up on said visor, and;

d) an anti-suffocation valve for allowing ambient air to flow into said mask during subject inhalation in the event that said breathing gas supply in interrupted or blocked.

29. The apparatus of claim 27 wherein said face mask further provides a means to prevent flow or leakage of pressurized gas from around the perimeter of the mask either into or out of the mask, said mask further providing a means for exhausting exhaled gas out of said mask and into the surrounding ambient environment.

30. The apparatus of claim 29 further including a second CBR filter in gas communication with said pressure regulator system and said ambient atmospheric gases for filtering chemical and biological substances and radiation fall out from said ambient atmospheric gases used to pressurize said gas segment of said PTS.

31. The apparatus of claim 29 further incorporating said CBR impermeable materials into outer surfaces of said BAM to preclude penetration of said CBR substances into said systems and preventing CBR contamination of the breathing gas, gas flow channels, and drinking interface means.

32. The apparatus of claim 31 further including a CBR filter in gas communication with an air blower and said breathing assist means for filtering out chemical and biological contaminants and radiation fall out from ambient atmospheric gases circulated to said subject by said air blower during nominal ground, ingress, and egress operations, and during emergency egress and escape.

33. The apparatus of claim 32 wherein said air blower is in gas communication with said CBR filter and said ambient atmospheric gases for facilitating air flow of said ambient atmospheric gases through said filter and into said breathing assist means during nominal ground, ingress, and egress operations, and during emergency egress and escape.

34. The apparatus of claim 33 further including a CBR power supply in electronic communication with said air blower for providing power to said blower during nominal ground, ingress, and egress operations, and during emergency egress and escape.

35. The apparatus of claim 1 further including CBR impermeable materials incorporated into outer layer of said suit to preclude penetration of said CBR substances through said outer layer thereby preventing contamination of said fluid between the layers of said suit, and said subject, said CBR impermeable materials also incorporated into the outer shell of said pressure helmet to preclude penetration of CBR substances into said space within said helmet thereby preventing CBR contamination within said space, and of said subject.

36. The apparatus of claim 1 further incorporating CBR impermeable materials into outer surfaces of said PTS to preclude penetration of CBR substances into said segments of said PTS thereby preventing CBR contamination of said fluid and said gas within said fluid and said gas segments of said PTS.

37. The apparatus of claim 1 further including CBR foot covers attached to the legs of said suit and incorporating said CBR impermeable materials into outer surface for preventing CBR contaminants from contacting the feet of said subject.

38. The apparatus of claim 1 further including CBR gloves attachable to the arms of said suit suing a CBR impermeable seal and incorporating said CBR impermeable materials into the outer surface for preventing CBR contaminants from contacting the hands of said subject.

39. The pressure helmet of claim 1 further including a visor also relatively impermeable to gases comprised of air, oxygen, nitrogen, or helium for providing said subject with an external vision means.

40. The visor of claim 39 further incorporating said CBR impermeable materials to preclude penetration of CBR substances into said space within the helmet thereby preventing CBR contamination within said space, and of said subject.

41. The visor of claim 39 further providing a means for filtering out or completely reflecting directed laser energy flash from laser threat sources thereby reducing or precluding laser energy reaching said subject's eyes.

42. The apparatus of Claim 41 further providing a pressure release valve for relieving pressurization of said pressure helmet when pressure within said gas segment of said PTS reaches or exceeds a safe maximum pressure necessary to preclude pressure induced injury to said subject.

43. The apparatus of claim 42 wherein said pressure release valve is adjustable so as to allow said subject the capability to preselect said maximum pressure value necessary to stop pressurization to said pressure helmet, said adjustability falling within the range of acceptable safe pressure values.

* * * * *